(12) United States Patent
Buchmann et al.

(10) Patent No.: US 8,908,398 B2
(45) Date of Patent: Dec. 9, 2014

(54) METHOD FOR OPERATING A CONVERTER CIRCUIT

(75) Inventors: Beat Buchmann, Nussbaumen (CH); Beat Ronner, Birr (CH)

(73) Assignee: ABB Technology AG, Zürich (CH)

( * ) Notice: Subject to any disclaimer, the term of this patent is extended or adjusted under 35 U.S.C. 154(b) by 433 days.

(21) Appl. No.: 13/310,113

(22) Filed: Dec. 2, 2011

(65) Prior Publication Data

US 2012/0140535 A1 Jun. 7, 2012

(30) Foreign Application Priority Data

Dec. 2, 2010 (EP) .................................... 10193422

(51) Int. Cl.
*H02M 1/40* (2007.01)
*H02H 7/04* (2006.01)
*H02M 7/5387* (2007.01)

(52) U.S. Cl.
CPC ............ *H02M 7/53871* (2013.01); *H02M 1/40* (2013.01)
USPC .................. 363/50; 363/55; 363/131; 361/35

(58) Field of Classification Search
USPC .......... 323/247, 355, 356; 363/15, 50, 55, 95, 363/131, 132, 178; 361/18, 35, 36
See application file for complete search history.

(56) References Cited

U.S. PATENT DOCUMENTS

| 4,748,550 | A | * | 5/1988 | Okado ............................ 363/98 |
| 5,355,299 | A | | 10/1994 | Carpita |
| 5,552,979 | A | | 9/1996 | Gu et al. |
| 6,577,111 | B1 | | 6/2003 | Dickmander et al. |
| 2002/0158616 | A1 | * | 10/2002 | Kovalevski et al. .......... 323/331 |
| 2005/0140352 | A1 | * | 6/2005 | Allain et al. ................... 323/357 |
| 2010/0014325 | A1 | * | 1/2010 | Raju et al. ....................... 363/37 |
| 2010/0026275 | A1 | * | 2/2010 | Walton .......................... 323/355 |
| 2010/0039206 | A1 | * | 2/2010 | Klopcic et al. ................ 336/221 |
| 2011/0299304 | A1 | * | 12/2011 | Coley et al. ................ 363/21.09 |

FOREIGN PATENT DOCUMENTS

EP 0580192 A2 1/1994

OTHER PUBLICATIONS

European Search Report issued on Jul. 6, 2011, for European Application No. 10193422.2.

* cited by examiner

*Primary Examiner* — Fred E Finch, III

(74) *Attorney, Agent, or Firm* — Buchanan Ingersoll & Rooney PC

(57) ABSTRACT

A method for operating a converter circuit is provided. The converter circuit includes a converter unit and a transformer. The transformer includes at least one winding set with a primary winding and a secondary winding. The converter unit is connected, on the AC voltage side, to the primary winding of the respective winding set. In order to compensate for undesirable saturation of the transformer, the converter unit is used to deliberately apply a DC voltage to the primary winding of the respective winding set of the transformer.

6 Claims, 3 Drawing Sheets

METHOD FOR OPERATING A CONVERTER CIRCUIT

RELATED APPLICATION

This application claims priority under 35 U.S.C. §119 to European Patent Application No. 10193422.2 filed in Europe on Dec. 2, 2010, the entire content of which is hereby incorporated by reference in its entirety.

FIELD

The present disclosure relates to the field of power electronics. More particularly, the present disclosure relates to a method for operating a converter circuit.

BACKGROUND INFORMATION

Converter circuits are known to include a converter unit with a multiplicity of controllable power semiconductor switches which are connected in a known manner for the purpose of switching at least two switching voltage levels. Such a converter circuit can be connected to an electrical AC voltage network which is in the form of a single-phase or three-phase network, for example. Such converter circuits are often used in industrial installations, where the AC voltage side of the converter unit of the converter circuit is coupled to the network via a transformer. Other fields of application and possible uses, for example wind power installations, are also naturally conceivable. FIG. 1 shows, by way of example, such a known converter circuit.

When connecting the transformer to an AC voltage network, the transformer may become saturated. Such saturation may also occur when the voltage returns following network faults. The extent of the saturation depends on the voltage/time integral during the network fault, that is to say is predominantly given by the AC voltage network. Following such a fault or when connecting the transformer to the AC voltage network, the magnetic flux of the transformer can have a significant DC component which then results in saturation. However, the saturation of the transformer is highly undesirable. FIG. 2 illustrates, by way of example, such a typical temporal profile of the magnetic flux of a winding set of the transformer of the converter circuit according to FIG. 1.

U.S. Pat. No. 6,577,111 B1 specifies a method of the generic type for operating a converter circuit, which method is able to compensate for undesirable saturation of a transformer of the converter circuit but does not return the magnetic flux to below the magnitude of a nominal value of the magnetic flux of the transformer.

SUMMARY

An exemplary embodiment of the present disclosure provides a method for operating a converter circuit. The converter circuit includes a converter unit having a multiplicity of controllable power semiconductor switches, and includes a transformer. The transformer has at least one winding set with a primary winding and a secondary winding. The converter unit is connected, on an AC voltage side, to the primary winding of the respective winding set. The exemplary method includes: (a) monitoring a magnitude of the magnetic flux of each winding set with respect to a threshold value, and determining the polarity of the magnetic flux of each corresponding winding set, respectively; (b) applying an adjustable negative DC voltage from the converter unit to the respective winding set when the magnitude of the magnetic flux through the respective winding set exceeds the threshold value and the polarity of the magnetic flux through the respective winding set is positive; (c) applying an adjustable positive DC voltage from the converter unit to the respective winding set when the magnitude of the magnetic flux through the respective winding set exceeds the threshold value and the polarity of the magnetic flux through the respective winding set is negative; (d) repeating steps a) to c) until the magnitude of the magnetic flux through the respective winding set undershoots the threshold value; (e) after the magnitude of the magnetic flux through the respective winding set has undershot the threshold value and when the polarity of the magnetic flux through the respective winding set is positive, applying the adjustable negative DC voltage from the converter unit to the primary winding of the respective winding set until a voltage/time integral of the applied negative DC voltage is less than or equal to a predefinable negative flux value; and (f) after the magnitude of the magnetic flux through the respective winding set has undershot the threshold value and when the polarity of the magnetic flux through the respective winding set is negative, applying the adjustable positive DC voltage from the converter unit to the primary winding of the respective winding set until a voltage/time integral of the applied positive DC voltage is greater than or equal to a predefinable positive flux value.

BRIEF DESCRIPTION OF THE DRAWINGS

Additional refinements, advantages and features of the present disclosure are described in more detail below with reference to exemplary embodiments illustrated in the drawings, in which.

Figure 1:
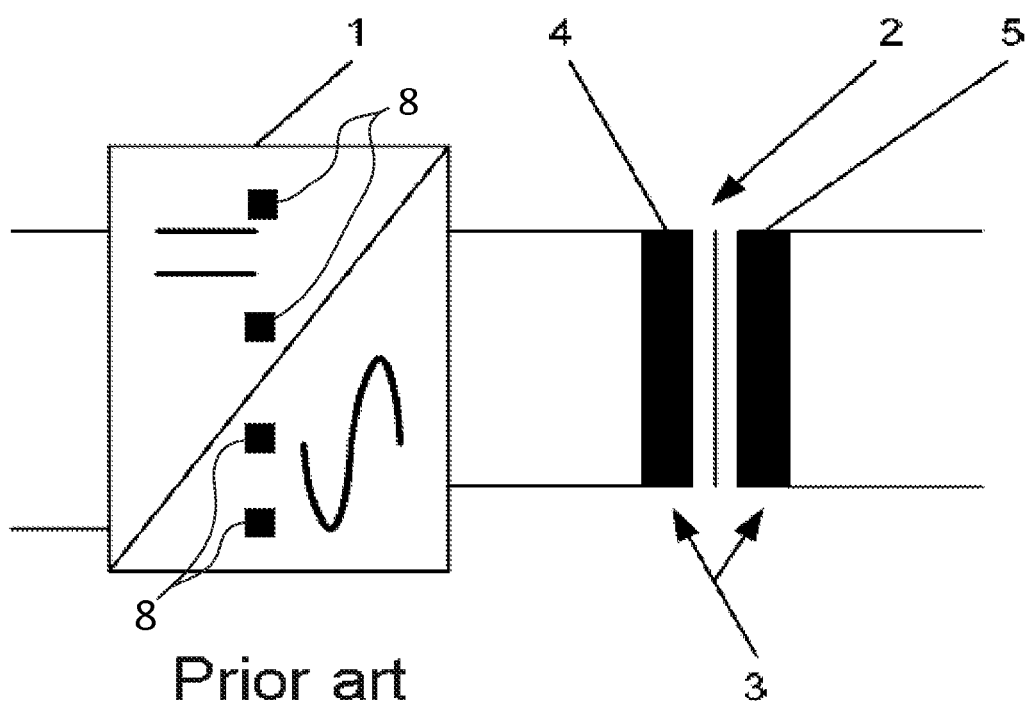
FIG. 1 shows a known converter circuit.
Figure 2:
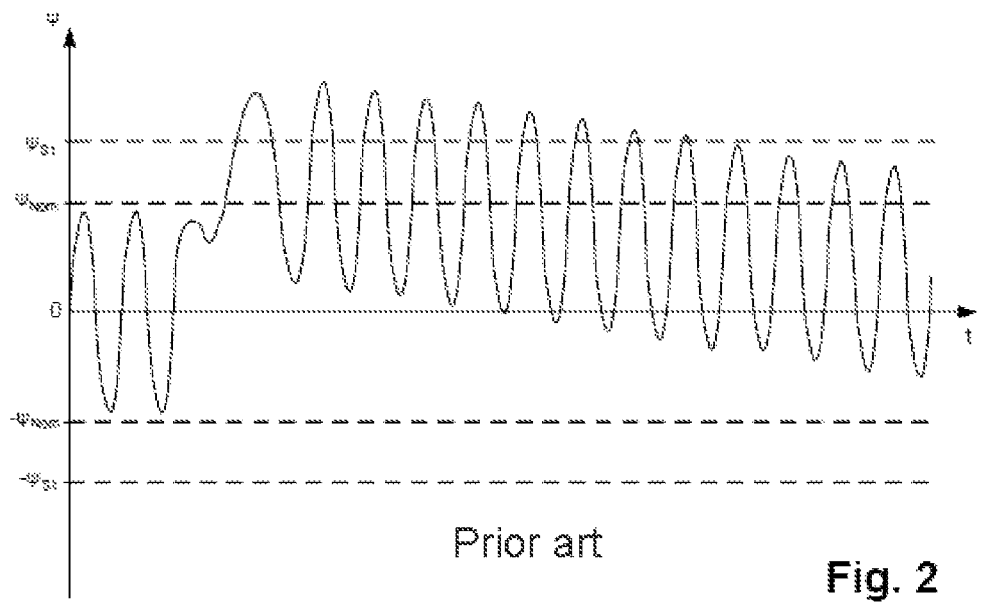
FIG. 2 shows a typical temporal profile of the magnetic flux of a winding set of a transformer of the converter circuit according to FIG. 1.
Figure 3:
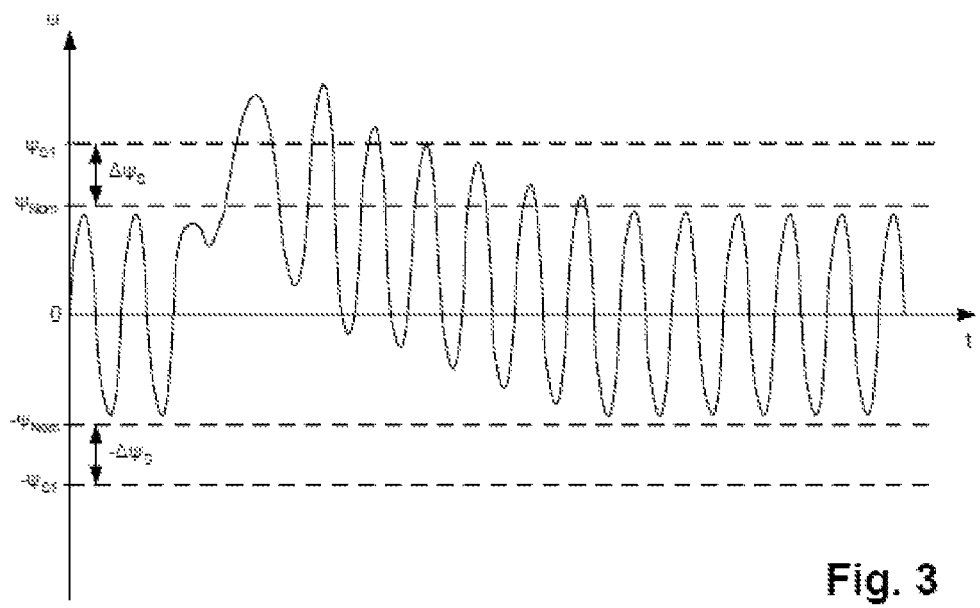
FIG. 3 shows a temporal profile of the magnetic flux of a winding set of the transformer of a converter circuit in accordance with an exemplary embodiment of a method according to the present disclosure.

The reference symbols used in the drawings and their meanings are listed in summarized form in the list of reference symbols. In principle, the same parts are provided with the same reference symbols in the drawings. The embodiments described represent the subject matter of the disclosure by way of example and do not have any restrictive effect.

DETAILED DESCRIPTION

Exemplary embodiments of the present disclosure provide a method for operating a converter circuit, which method can be used to compensate for undesirable saturation of a transformer of the converter circuit within a short space of time.

In accordance with an exemplary embodiment, the converter circuit includes a converter unit with a multiplicity of controllable power semiconductor switches, and the converter circuit also includes a transformer. The transformer has at least one winding set with a primary winding and a secondary winding. The converter unit is configured to be connected, on the AC voltage side, to the primary winding of the respective winding set. In accordance with an exemplary embodiment, the method according to the present disclosure for operating such a converter circuit can include the following steps:

a) the magnitude of the magnetic flux of each winding set is monitored with respect to a threshold value, and the polarity of the magnetic flux is determined;

b) if the magnitude of the magnetic flux through the respective winding set exceeds the threshold value and the polarity of the magnetic flux through the respective winding set is positive, the converter unit applies an adjustable negative DC voltage to the primary winding of the respective winding set;

c) if the magnitude of the magnetic flux through the respective winding set exceeds the threshold value and the polarity of the magnetic flux through the respective winding set is negative, the converter unit applies an adjustable positive DC voltage to the primary winding of the respective winding set;

d) steps a) to c) are repeated until the magnitude of the magnetic flux through the respective winding set undershoots the threshold value;

e) after the magnitude of the magnetic flux through the respective winding set has undershot the threshold value and if the polarity of the magnetic flux through the respective winding set is positive, the converter unit applies the adjustable negative DC voltage to the primary winding of the respective winding set until the voltage/time integral of the applied negative DC voltage is less than or equal to a predefinable negative flux value; and f) after the magnitude of the magnetic flux through the respective winding set has undershot the threshold value and if the polarity of the magnetic flux through the respective winding set is negative, the converter unit applies the adjustable positive DC voltage to the primary winding of the respective winding set until the voltage/time integral of the applied positive DC voltage is greater than or equal to a predefinable positive flux value.

In accordance with an exemplary embodiment, the threshold value is the value above which the saturation of the transformer begins. Upon saturation of the respective winding set of the transformer, the abovementioned steps a) to d) advantageously cause the saturation to be compensated for in a simple and rapid manner by the converter unit applying a positive or negative DC voltage, that is to say the magnetic flux through the respective winding set is taken from the saturation range. If there is no longer any saturation of the respective winding set of the transformer, that is to say after the magnitude of the magnetic flux through the respective winding set has undershot the threshold value, steps e) and f) advantageously result in the magnetic flux of the respective winding set, for example, being able to be brought below the magnitude of a nominal value of the magnetic flux of the transformer again. In accordance with an exemplary embodiment, the magnitude of the nominal value of the magnetic flux is, for example, the threshold value reduced by the flux value. The method of the present disclosure therefore achieves the desired effect of compensating for any saturation of the transformer and returning the magnetic flux through the respective winding set to below the magnitude of the nominal value of the magnetic flux in a particularly simple manner.

These aspects, advantages and features of the present disclosure will become clear from the following detailed description of exemplary embodiments of the disclosure in conjunction with the drawings.

As already mentioned at the outset, FIG. 1 shows a known converter circuit which includes a converter unit 1 with a multiplicity of controllable power semiconductor switches 8. The converter circuit also includes a transformer 2, which generally has at least one winding set 3 with a primary winding 4 and a secondary winding 5. The converter unit 1 is configured to be connected, on the AC voltage side, to the primary winding 4 of the respective winding set 3. In FIG. 1, the transformer 2 has a single-phase design, by way of example, and therefore has only a single winding set 3. However, the transformer 2 can have a multi-phase design.

In accordance with an exemplary embodiment, the method according to the present disclosure for operating the converter circuit can include the following steps:

a) the magnitude of the magnetic flux $\psi$ of each winding set 3 is monitored with respect to a threshold value $\psi_{S1}$, and the polarity of the magnetic flux $\psi$ of the corresponding winding set 3 is determined for each winding set 3;

b) if the magnitude of the magnetic flux $\psi$ through the respective winding set 3 exceeds the threshold value $\psi_{S1}$ and the polarity of the magnetic flux $\psi$ through the respective winding set 3 is positive, the converter unit 1 applies an adjustable negative DC voltage $u_{comp}$ to the primary winding 4 of the respective winding set 3;

c) if the magnitude of the magnetic flux $\psi$ through the respective winding set 3 exceeds the threshold value $\psi_{S1}$ and the polarity of the magnetic flux iv through the respective winding set 3 is negative, the converter unit 1 applies an adjustable positive DC voltage $u_{comp}$ to the primary winding 4 of the respective winding set 3;

d) steps a) to c) are repeated until the magnitude of the magnetic flux $\psi$ through the respective winding set 3 undershoots the threshold value $\psi_{S1}$;

e) after the magnitude of the magnetic flux $\psi$ through the respective winding set 3 has undershot the threshold value $\psi_{S1}$ and if the polarity of the magnetic flux $\psi$ through the respective winding set 3 is positive, the converter unit 1 applies the adjustable negative DC voltage $u_{comp}$ to the primary winding 4 of the respective winding set 3 until the voltage/time integral of the applied negative DC voltage $u_{comp}$ is less than or equal to a predefinable negative flux value $-\Delta\psi_S$; and f) after the magnitude of the magnetic flux $\psi$ through the respective winding set 3 has undershot the threshold value $\psi_{S1}$ and if the polarity of the magnetic flux $\psi$ through the respective winding set 3 is negative, the converter unit 1 applies the adjustable positive DC voltage $u_{comp}$ to the primary winding 4 of the respective winding set 3 until the voltage/time integral of the applied positive DC voltage $u_{comp}$ is greater than or equal to a predefinable positive flux value $\Delta\psi_S$.

The threshold value $\psi_{S1}$ denotes the value above which the saturation of the transformer 2 begins. Upon saturation of the respective winding set 3 of the transformer 2, the abovementioned steps a) to d) advantageously cause the saturation to be compensated for in a simple and rapid manner by the converter unit 1 applying a positive or negative DC voltage $u_{comp}$, that is to say the magnetic flux $\psi$ through the respective winding set 3 is taken from the saturation range. If there is no longer any saturation of the respective winding set 3 of the transformer 2, that is to say after the magnitude of the magnetic flux $\psi$ through the respective winding set 3 has undershot the threshold value $\psi_{S1}$, steps e) and f) advantageously result in the magnetic flux $\psi$ of the respective winding set 3 being able to be brought below the magnitude of a nominal value $\psi_{Nom}$ of the magnetic flux $\psi$ of the transformer 2 again. In accordance with an exemplary embodiment, the magnitude of the nominal value $\psi_{Nom}$ of the magnetic flux $\psi$ can be, for example, the threshold value $\psi_{S1}$ reduced by the flux value $\Delta\psi_S$, that is to say $\Delta\psi_S = \psi_{S1} - \psi_{Nom}$.

The exemplary method of the present disclosure therefore achieves the desired effect of compensating for any saturation of the transformer 2 and returning the magnetic flux ψ through the respective winding set 3 to below the magnitude of the nominal value $\psi_{Nom}$ of the magnetic flux ψ in a particularly simple manner.

The voltage/time integral mentioned in step e) is calculated as follows:

$$\int u^{comp} dt,$$

where, according to step e), the converter unit 1 then applies the adjustable negative DC voltage $u_{comp}$ to the primary winding 4 of the respective winding set 3 until the voltage/time integral of the applied negative DC voltage $u_{comp}$ is less than or equal to the predefinable negative flux value $-\Delta\psi_s$, that is to say $\int u_{comp} dt \leq -\Delta\psi_s$.

Furthermore, the voltage/time integral mentioned in step f) is calculated as follows:

$$\int u_{comp} dt,$$

where, according to step f), the converter unit 1 then applies the adjustable positive DC voltage $u_{comp}$ to the primary winding 4 of the respective winding set 3 until the voltage/time integral of the applied positive DC voltage $u_{comp}$ is greater than or equal to the predefinable positive flux value $\Delta\psi_s$, that is to say $\int u_{comp} dt \geq \Delta\psi_S$.

However, the converter can make the saturation decay in a significantly faster manner by applying a DC voltage to the transformer which retrieves the flux from the saturation. The direct currents which occur in the process limit the time in which this takes place.

According to an exemplary embodiment of the present disclosure, the method can additionally include the following steps:

g) during steps e) and f), the magnitude of the magnetic flux ψ of each winding set 3 is monitored with respect to a threshold value $\psi_{S1}$, and the polarity of the corresponding magnetic flux ψ of the respective winding set 3 is determined;

h) if, during step e), the magnitude of the magnetic flux ψ through the respective winding set 3 exceeds the threshold value $\psi_{S1}$ and the polarity of the magnetic flux ψ through the respective winding set 3 is positive, step e) is suspended and the method continues with steps b) and d) and then with steps e) and f); and i) if, during step f), the magnitude of the magnetic flux ψ through the respective winding set 3 exceeds the threshold value $\psi_{S1}$ and the polarity of the magnetic flux ψ through the respective winding set 3 is negative, step f) is suspended and the method continues with steps c) and d) and then with steps e) and f).

The abovementioned step h) in conjunction with step g) ensures that, if saturation of the respective winding set 3 of the transformer 2 occurs with a positive magnetic flux ψ during step e), this saturation is compensated for in a simple and rapid manner by the converter unit 1 applying the negative DC voltage $u_{comp}$, that is to say the magnetic flux ψ through the respective winding set 3 is taken from the saturation range. If saturation of the respective winding set 3 of the transformer 2 occurs with a negative magnetic flux ψ during the abovementioned step f), the abovementioned step i) in conjunction with step g) makes it possible to compensate for the saturation by the converter unit 1 applying the positive DC voltage $u_{comp}$, that is to say the magnetic flux ψ through the respective winding set 3 is taken from the saturation range.

Figure 4:
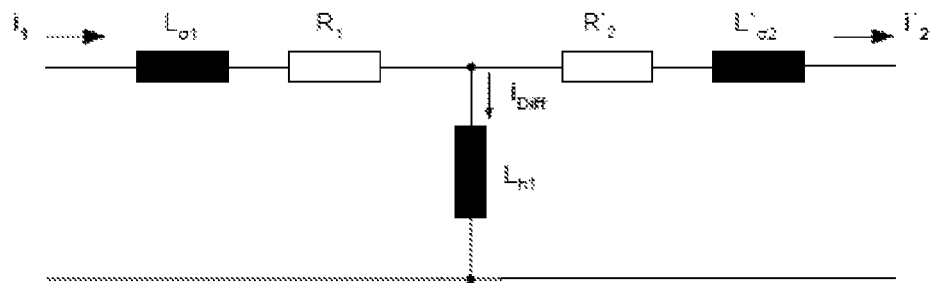
FIG. 4 shows a conventional T equivalent circuit diagram of a transformer.
Figure 5:
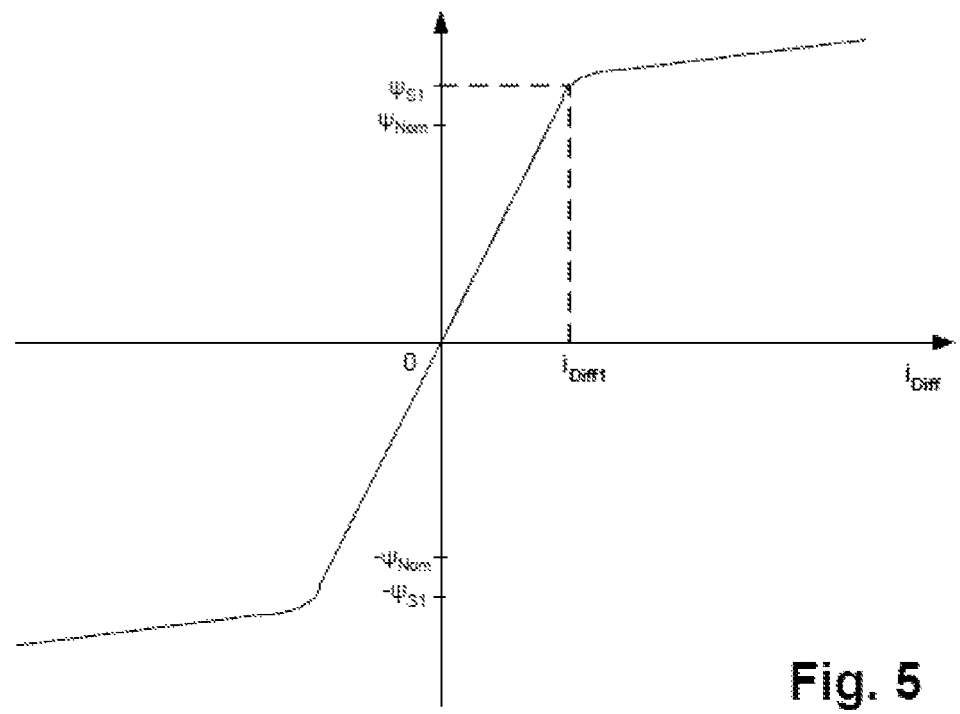
FIG. 5 shows a magnetization current/flux characteristic curve of a transformer.

In accordance with an exemplary embodiment, the operations of monitoring the magnitude of the magnetic flux ψ with respect to the threshold value $\psi_{S1}$ and determining the polarity of the magnetic flux ψ can be carried out by monitoring a differential current $i_{Diff}$ with respect to a differential current threshold value $i_{Diff1}$. The differential current $i_{Diff}$ can be determined from the current $i_1$ through the primary winding 4 and from the current $i'_2$ through the secondary winding 5 of the respective winding set 3, for example, taking into account the winding ratio. In this respect, FIG. 4 shows a known T equivalent circuit diagram of a transformer 2, which shows the current $i_1$ through the primary winding 4, the current through the secondary winding 5 and the differential current $i_{Diff}$ through the main inductance $L_{h1}$ of the respective winding set 3. The differential current $i_{Diff}$ is the magnetization current of the associated winding set 3 of the transformer. Furthermore, FIG. 5 illustrates a magnetization current/flux characteristic curve of a transformer 2, which reveals how the differential current threshold value $i_{Diff1}$ is connected with the threshold value $\psi_{S1}$. In order to monitor the differential current $i_{Diff}$ with respect to a differential current threshold value $i_{Diff1}$, the differential current $i_{Diff}$ therefore only needs to be determined from the current $i_1$ through the primary winding 4 and the current $i'_2$ through the secondary winding 5, where the current $i_1$ through the primary winding 4 and the current through the secondary winding 5 are measured. The differential current $i_{Diff}$ can then be monitored with respect to the differential current threshold value $i_{Diff1}$, which is connected with the threshold value $\psi_{S1}$ according to FIG. 5, using the connection between the differential current $i_{Diff}$ and the magnetic flux according to FIG. 5. Since the differential current $i_{Diff}$ can be determined in a very simple manner using the current $i_1$ through the primary winding 4 and the current through the secondary winding 5, the operations of monitoring the magnitude of the magnetic flux ψ with respect to the threshold value $\psi_{S1}$ and determining the polarity of the magnetic flux ψ can advantageously be carried out in a conceivably simple manner by monitoring a differential current $i_{Diff}$ with respect to the differential current threshold value $i_{Diff1}$.

It is also conceivable for the operations of monitoring the magnitude of the magnetic flux ψ with respect to the threshold value $\psi_{S1}$ and determining the polarity of the magnetic flux ψ to be carried out using a model of the magnetic flux ψ, in which the magnetic flux ψ is determined from the voltage across the primary winding 4 or from the voltage of the secondary winding 5 of the respective winding set 3, where generally $\psi = \int u_{Mag} dt$ and $u_{Mag}$ is then generally the magnetization voltage of the transformer 2. This may be calculated in a manner known to a person skilled in the art from the measured voltages and currents taking into account the transformer impedances and stray impedances. In addition, the threshold value $\psi_{S1}$ and the flux value $\Delta\psi_S$ for the monitoring operation can be predefined, for example, using the magnetization current/flux characteristic curve of the transformer illustrated in FIG. 5.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Reference Symbols
1 Converter unit
2 Transformer
3 Winding set
4 Primary winding
5 Secondary winding

What is claimed is:

1. A method for operating a converter circuit, wherein the converter circuit includes a converter unit having a multiplicity of controllable power semiconductor switches, and includes a transformer, which has at least one winding set with a primary winding and a secondary winding, the converter unit being connected, on an AC voltage side, to the primary winding of the respective winding set, wherein the method comprises:
   a) monitoring a magnitude of the magnetic flux of each winding set with respect to a threshold value, and determining the polarity of the magnetic flux of each corresponding winding set, respectively;
   b) applying an adjustable negative DC voltage from the converter unit to the respective winding set when the magnitude of the magnetic flux through the respective winding set exceeds the threshold value and the polarity of the magnetic flux through the respective winding set is positive;
   c) applying an adjustable positive DC voltage from the converter unit to the respective winding set when the magnitude of the magnetic flux through the respective winding set exceeds the threshold value and the polarity of the magnetic flux through the respective winding set is negative;
   d) repeating steps a) to c) until the magnitude of the magnetic flux through the respective winding set undershoots the threshold value;
   e) after the magnitude of the magnetic flux through the respective winding set has undershot the threshold value and when the polarity of the magnetic flux through the respective winding set is positive, applying the adjustable negative DC voltage from the converter unit to the primary winding of the respective winding set until a voltage/time integral of the applied negative DC voltage is less than or equal to a predefinable negative flux value; and
   f) after the magnitude of the magnetic flux through the respective winding set has undershot the threshold value and when the polarity of the magnetic flux through the respective winding set is negative, applying the adjustable positive DC voltage from the converter unit to the primary winding of the respective winding set until a voltage/time integral of the applied positive DC voltage is greater than or equal to a predefinable positive flux value.

2. The method as claimed in claim 1, comprising:
   g) during steps e) and f), monitoring the magnitude of the magnetic flux of each winding set with respect to the threshold value, and determining the polarity of the magnetic flux of each corresponding winding set, respectively;
   h) suspending step e) when, during step e), the magnitude of the magnetic flux through the respective winding set exceeds the threshold value and the polarity of the magnetic flux through the respective winding set is positive, and continuing with steps b) and d) and then with steps e) and f); and
   i) suspending step f) when, during step f), the magnitude of the magnetic flux through the respective winding set exceeds the threshold value and the polarity of the magnetic flux through the respective winding set is negative, and continuing with steps c) and d) and then with steps e) and f).

3. The method as claimed in claim 2, wherein the steps of monitoring the magnitude of the magnetic flux and determining the polarity of the magnetic flux are carried out by monitoring a differential current with respect to a differential current threshold value,
   wherein the differential current is determined from a current through the primary winding and from a current through the secondary winding of the respective winding set.

4. The method as claimed in claim 3, wherein the magnitude of the magnetic flux is monitored using a model of the magnetic flux.

5. The method as claimed in claim 1, wherein the steps of monitoring the magnitude of the magnetic flux and determining the polarity of the magnetic flux are carried out by monitoring a differential current with respect to a differential current threshold value,
   wherein the differential current is determined from a current through the primary winding and from a current through the secondary winding of the respective winding set.

6. The method as claimed in claim 1, wherein the magnitude of the magnetic flux is monitored using a model of the magnetic flux.

* * * * *